Sept. 25, 1951  C. R. BAKER  2,568,978
APPARATUS FOR FORMING MOLDS AND INVESTING PATTERNS
Filed Sept. 27, 1950
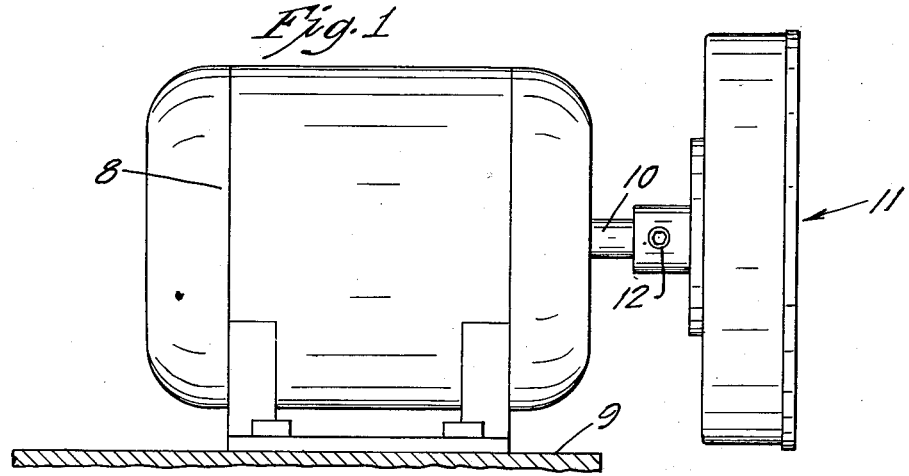
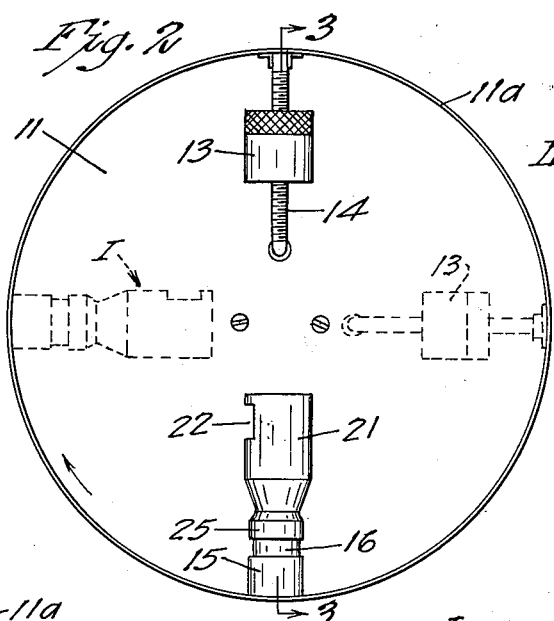
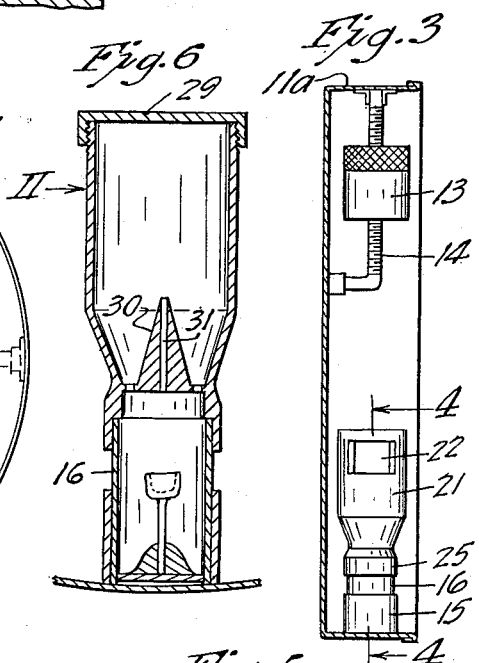
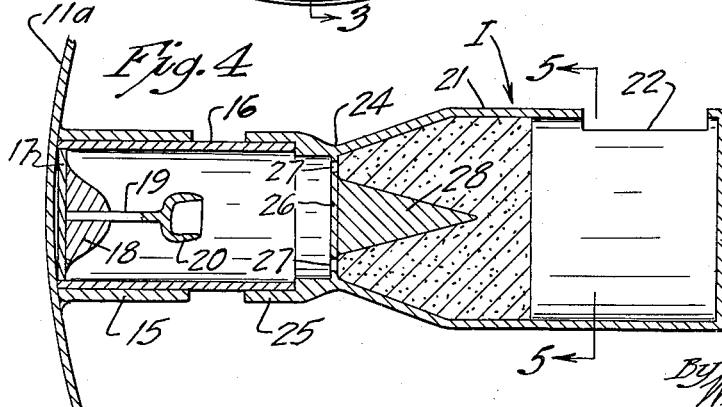
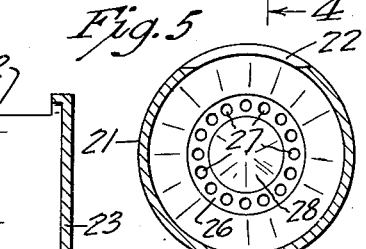
Inventor
Claude R. Baker
By Williamson & Williamson
Attorneys

UNITED STATES PATENT OFFICE 2,568,978

APPARATUS FOR FORMING MOLDS AND INVESTING PATTERNS

Claude R. Baker, Chapel Hill, N. C.

Application September 27, 1950, Serial No. 187,084

4 Claims. (Cl. 18—5.7)

This invention relates generally to an apparatus for forming molds and investing patterns particularly for use in dental work and manufacturing small articles of jewelry.

It has long been a problem in casting small articles to produce mold structures having a minimum of voids surrounding the mold cavity, which voids produce irregularities on the surface of articles being cast. By producing extremely dense investing material from which a large portion of the air and moisture has been removed these voids may be largely eliminated from the investing material.

It is an object of my invention to provide a relatively simple yet highly efficient apparatus for producing by Venturi action through the use of centrifugal force, an extremely dense investing material from which air bubbles and a large portion of the moisture therein has been removed and which therefore produces an extremely accurate cast for subsequently casting small articles.

It is another object to provide apparatus having a supply chamber communicating with an investment chamber in which a precast pattern is mounted and having a dividing partition with a plurality of communicating openings formed in the marginal peripheral portion thereof and forming an annular inter-communication element through which material is discharged from the supply chamber into the investment chamber when centrifugal force is applied to the apparatus by any suitable means, said partition having a conical section mounted in outstanding relation thereto and extending into the supply chamber to guide the investment material annularly outwardly to the annularly disposed openings through which said material is forced at relatively high speeds to produce a Venturi action and a low pressure area adjacent the longitudinal center line of the investment chamber in close proximity to the dividing partition, to thus remove and suck out of the investment material substantially all of the air bubbles and a large portion of the moisture to deposit an extremely dense investment material at the base of the investment chamber and surrounding the preformed pattern mounted in said chamber.

It is a further object to provide two forms of investment apparatus, one form having a closed supply chamber with a communicating aperture extending axially through said cone and affording communication between the central portions of the supply chamber and the investment chamber whereby the pressure between the two chambers will be equalized, and another form having a supply chamber open to the atmosphere to prevent a vacuum from forming therein when material is discharged into the investment chamber and having a solid imperforate cone therein.

These and other objects and advantages of my invention will more fully appear from the following description made in connection with the accompanying drawings, wherein like reference characters refer to similar parts throughout the several views and, in which:

Fig. 1 is a side elevational view of a motor having a centrifugal head mounted thereon;

Fig. 2 is a front elevational view of the head shown in Fig. 1;

Fig. 3 is a vertical sectional view taken substantially along the line 3—3 of Fig. 2;

Fig. 4 is a vertical sectional view taken substantially along line 4—4 of Fig. 3, showing one form of my investment apparatus;

Fig. 5 is a transverse sectional view taken substantially along the line 5—5 of Fig. 4; and Fig. 6 is a vertical sectional view similar to Fig. 4, showing an alternative form of my investment apparatus.

As illustrated in the accompanying drawings, I provide any suitable means for applying centrifugal force to my investing apparatus, such as the electric motor 8 shown in Fig. 1, mounted on a suitable base 9 and having the high speed rotary drive shaft 10. A centrifuge head 11 is fixed to shaft 10 as by the set screw 12. In the form shown this head has an annular flange 11a fixed around the periphery thereof. A counter-balancing weight 13 is threadably mounted on a screw shaft 14 which is fixed at one end to the back plate of the head 11 and at the other end to the flange 11a, to permit longitudinal adjustment of the counter-balancing weight 13 relative to the axis of rotation.

Suitable mounting means for my investment apparatus is provided in diametrically opposed relation to the counter-balancing weight 13, such as the mounting sleeve 15 which is fixed to the flange 11a as by being welded thereto. An investment chamber is formed as by the investment ring or cylinder 16 base member 17 having a sprue mounting projection 18 fixed thereon and extending into said chamber. A sprue 19 is mounted in member 18 and has a pattern 20 fixed to the free end thereof. This pattern is made from any suitable material which can be easily and completely removed from the cavity. In dental practice a wax product is frequently used for this purpose and hence the name "lost wax process" for preparing molds in this manner.

A supply chamber is formed from the generally cylindrical material confining member 21 which in the form of the invention illustrated in Figs. 2 through 5 inclusive has a supply opening 22 formed in the inner portion of the side wall thereof adjacent the closed end 23. The sides of the substantially cylindrical member 21 taper somewhat at the outer portion of the supply chamber to form a diminished neck portion 24. Suitable mounting means such as the mounting flange 25 extend outwardly from the neck 24 and receive the inner portion of the investment ring or cylinder 16.

A dividing partition separates the supply chamber from the investment chamber and is designated by the numeral 26. Annular inter-communication means are formed around the peripheral marginal portion of said partition 26 and, in the form shown, consist in a plurality of apertures 27 extending therethrough. A material guiding and confining cone 28 is fixed to said partition and extends inwardly therefrom a substantial distance into the supply chamber, as best shown in Fig. 4. In this form of my invention designated by the Roman numeral I and illustrated in Figs. 2 through 5 inclusive, the guiding and confining cone 28 is imperforate.

An alternative form of my invention is illustrated in Fig. 6 and is designated by the Roman numeral II. The supply chamber in this form of the invention is completely closed as by a screw cap 29. A guiding and confining cone 30 extends into the supply chamber and the outer portion thereof is similarly constructed to the guiding and confining cone 28; however, the guiding and confining cone 30 has an axially disposed passage 31 extending therethrough and affording central communication between the supply chamber and the investment chamber. The investment chamber in form II of my invention is similarly constructed to the investment chamber illustrated and described in form I.

*Operation*

In form I of my invention any suitable investment material, usually ceramic in nature such as plaster of Paris, is supplied to the supply chamber through opening 22 when the head 11 is swung up into the dotted position shown in Fig. 2. When a predetermined volume of investment material has been poured into the supply chamber 40 the motor 8 is started and revolves the head 11 at extremely high speed. The centrifugal force forces the semi-fluid investment material through the apertures 27 at a relatively high speed, producing high pressures along the side wall of the ring 16 and relatively low pressures at the center thereof particularly adjacent the investment side of partition 26. The cone 28 confines and guides the material outwardly toward the apertures 27 and increases the speed of discharge therethrough which materially increases the Venturi action. The Venturi action removes substantially all of the air bubbles from the material as well as a large portion of the moisture and surrounds the pattern 20 with extremely dense material. The tapered side walls of the outer portion of cylinder 21 produce additional confinement of the investment material and increase the speed of discharge thereof through the openings 27.

In form II of my invention the operation and function of the cone and tapered side walls is identical to that described for form I, however, since the supply chamber is closed by cap 29 the passage 31 formed through the cone 30 is necessary to equalize the pressures of the two chambers. This passage could of course be formed in the cone 28, and it is conceivable that this would increase the speed of discharge of the investment material through the apertures 27 by releasing the pressure built up in the investment chamber when the investment material rushes therein.

My new method of preparing molds consists in the following steps: Supplying investment material to a supply chamber, forcing said investment material through annular inter-communication means into an investment chamber, confining said material as it is forced through said inter-communication means, the high speed discharge of the investment material through said annular inter-communication means produces a Venturi action which has been previously described.

It will be seen that I have provided an extremely simple yet highly efficient method and apparatus for forming molds and investing patterns particularly adapted for use in dental work and in the manufacturing of small articles of jewelry. The Venturi action produced during the investment process densifies the investment material by removing the air pockets therefrom and by removing a substantial portion of the moisture therefrom.

It will, of course, be understood that various changes may be made in the form, details, arrangement and proportions of the parts of the apparatus disclosed herein without departing from the scope of my invention.

What I claim is:

1. Apparatus for investing a mold pattern, said apparatus comprising means defining a supply chamber, means defining an investment chamber disposed outwardly from said supply chamber in end to end axially arranged relation thereto, a dividing partition interposed between said two chambers, said partition having annular intercommunication means formed around the marginal peripheral portion thereof, and a substantially conical guiding and confining member having its base mounted on said partition within said annular inter-communication means and extending from said partition into said supply chamber, said apparatus being adapted to be centrifugally revolved with the investment chamber disposed outwardly of the supply chamber to force the material from said supply chamber through said inter-communication means and produce a Venturi action to remove the air bubbles and a substantial portion of the moisture from said investment material to densify said material.

2. The structure set forth in claim 1, and said supply chamber being closed and said conical guiding and confining member having an axially disposed passage formed therein to afford communication between said investment chamber and said supply chamber.

3. The structure set forth in claim 1 and said conical guiding and confining member having an axially disposed passage formed therein to afford communication between the investment chamber and the supply chamber to equalize the pressures therebetween.

4. The structure set forth in claim 1, and the means defining said supply chamber being tapered toward said partition to combine with the conical guiding and confining member to form a gradually diminishing annular passage for delivering material to said intercommunication means and increase the speed of discharge therethrough.

CLAUDE R. BAKER.

REFERENCES CITED

The following references are of record in the file of this patent:

UNITED STATES PATENTS

| Number | Name | Date |
|---|---|---|
| 1,535,017 | Cline | Apr. 21, 1925 |
| 1,846,913 | Shapiro | Feb. 23, 1932 |
| 1,913,740 | Ambruehl | June 13, 1933 |
| 2,024,615 | Tonceda | Dec. 17, 1935 |
| 2,147,103 | McKee | Feb. 14, 1939 |